(12) United States Patent
Sharlin et al.

(10) Patent No.: US 12,135,445 B2
(45) Date of Patent: Nov. 5, 2024

(54) METHOD OF FABRICATING A LIGHT-GUIDE OPTICAL ELEMENT

(71) Applicant: Lumus Ltd., Ness Ziona (IL)

(72) Inventors: Elad Sharlin, Mishmar David (IL); Dror Hermoni, Kibbutz Usha (IL)

(73) Assignee: LUMUS LTD., Ness Ziona (IL)

( * ) Notice: Subject to any disclaimer, the term of this patent is extended or adjusted under 35 U.S.C. 154(b) by 552 days.

(21) Appl. No.: 17/429,977

(22) PCT Filed: Apr. 14, 2020

(86) PCT No.: PCT/IB2020/053492
§ 371 (c)(1),
(2) Date: Aug. 11, 2021

(87) PCT Pub. No.: WO2020/212835
PCT Pub. Date: Oct. 22, 2020

(65) Prior Publication Data
US 2022/0137274 A1 May 5, 2022

Related U.S. Application Data

(60) Provisional application No. 62/833,808, filed on Apr. 15, 2019.

(51) Int. Cl.
*G02B 5/28* (2006.01)
*B29D 11/00* (2006.01)
*G02B 27/01* (2006.01)

(52) U.S. Cl.
CPC ........ *G02B 5/285* (2013.01); *B29D 11/00663* (2013.01); *B29D 11/00865* (2013.01); *G02B 27/0172* (2013.01)

(58) Field of Classification Search
CPC ................ G02B 5/285; G02B 27/0172; B29D 11/00663; B29D 11/00865
(Continued)

(56) References Cited

U.S. PATENT DOCUMENTS 2,748,659 A 6/1956 Geffcken et al.
2,795,069 A 6/1957 Hardesty
(Continued)

FOREIGN PATENT DOCUMENTS

CN 200941530 Y 9/2007
CN 101542346 9/2009
(Continued)

OTHER PUBLICATIONS

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.
(Continued)

*Primary Examiner* — Joseph P Martinez
*Assistant Examiner* — Grant A Gagnon
(74) *Attorney, Agent, or Firm* — Rivka Friedman

(57) ABSTRACT

A method of fabricating a light-guide optical element having a plurality of partially reflecting surfaces is disclosed. The method includes providing a plurality of transparent plates, each plate polished on two opposite surfaces such that the surfaces are parallel to each other, coating a first of the surfaces of a subset of plates with a first coating, coating a second of the surfaces of the subset of plates with a second coating; bonding together the plurality of transparent plates to form a stack, and cutting the stack along parallel planes obliquely angled to the faces of the transparent plates so as to form the optical element, wherein the first coating is a partially reflective coating have a first set of mechanical properties, and the second coating is selected from the group consisting of: a coating similar to the first coating and a non-reflective coating having a second set of mechanical properties substantially similar to the first set of mechanical properties.

7 Claims, 8 Drawing Sheets

(58) Field of Classification Search
USPC ......................................................... 359/584
See application file for complete search history.

(56) References Cited

U.S. PATENT DOCUMENTS

| | | | |
|---|---|---|---|
| 2,886,911 A | 5/1959 | Hardesty |
| 3,491,245 A | 1/1970 | Hardesty |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,829,197 A | 8/1974 | Thelen |
| 3,857,109 A | 12/1974 | Pilloff |
| 3,873,209 A | 3/1975 | Schinke et al. |
| 3,940,204 A | 2/1976 | Withrington |
| 3,969,023 A | 7/1976 | Brandt |
| 4,084,883 A | 4/1978 | Eastman et al. |
| 4,191,446 A | 3/1980 | Arditty et al. |
| 4,309,070 A | 1/1982 | St Leger Searle |
| 4,331,387 A | 5/1982 | Wentz |
| 4,355,864 A | 10/1982 | Soref |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,208,800 A | 5/1993 | Isobe et al. |
| 5,231,642 A | 7/1993 | Scifres et al. |
| 5,235,589 A | 8/1993 | Yokomori et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Meinrad |
| 5,712,694 A | 1/1998 | Taira et al. |
| 5,724,163 A | 3/1998 | David |
| 5,751,480 A | 5/1998 | Kitagishi |
| 5,764,412 A | 6/1998 | Suzuki et al. |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Amitai et al. |
| 5,982,536 A | 11/1999 | Swan |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,185,015 B1 | 2/2001 | Silviu et al. |
| 6,222,676 B1 | 4/2001 | Togino et al. |
| 6,231,992 B1 | 5/2001 | Niebauer et al. |
| 6,239,092 B1 | 5/2001 | Papasso et al. |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,490,104 B1 | 12/2002 | Gleckman et al. |
| 6,509,982 B2 | 1/2003 | Steiner |
| 6,542,298 B1 | 4/2003 | Aoki |
| 6,542,307 B2 | 4/2003 | Gleckman |
| 6,556,282 B2 | 4/2003 | Jamieson et al. |
| 6,577,411 B1 | 6/2003 | David |
| 6,580,529 B1 | 6/2003 | Amitai et al. |
| 6,671,100 B1 | 12/2003 | McRuer |
| 6,690,513 B2 | 2/2004 | Hulse et al. |
| 6,710,902 B2 | 3/2004 | Takeyama |
| 6,829,095 B2 | 4/2004 | Amitai |
| 6,775,432 B2 | 8/2004 | Basu |
| 6,791,760 B2 | 9/2004 | Janeczko et al. |
| 6,798,579 B2 | 9/2004 | Robinson et al. |
| 6,847,488 B2 | 1/2005 | Travis |
| 6,880,931 B2 | 4/2005 | Moliton et al. |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,355,795 B1 | 4/2008 | Yamazaki et al. |
| 7,391,573 B2 | 6/2008 | Amitai |
| 7,405,881 B2 | 7/2008 | Shimizu et al. |
| 7,418,170 B2 | 8/2008 | Mukawa et al. |
| 7,430,355 B2 | 9/2008 | Heikenfeld et al. |
| 7,448,170 B2 | 11/2008 | Milovan et al. |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,672,055 B2 | 3/2010 | Amitai |
| 7,724,442 B2 | 5/2010 | Amitai |
| 7,724,443 B2 | 5/2010 | Amitai |
| 7,736,006 B2 | 6/2010 | Freeman |
| 7,778,508 B2 | 8/2010 | Hirayama |
| 7,949,214 B2 | 5/2011 | Dejong |
| 7,995,275 B2 | 8/2011 | Maeda et al. |
| 8,000,020 B2 | 8/2011 | Amitai |
| 8,035,872 B2 | 10/2011 | Ouchi |
| 8,098,439 B2 | 1/2012 | Amitai et al. |
| 8,187,481 B1 | 5/2012 | Hobbs |
| 8,369,019 B2 | 2/2013 | Baker et al. |
| 8,405,573 B2 | 3/2013 | Lapidot et al. |
| 8,432,614 B2 | 4/2013 | Amitai |
| 8,472,119 B1 | 6/2013 | Kelly |
| 8,479,119 B2 | 7/2013 | Hörentrup et al. |
| 8,643,948 B2 | 2/2014 | Amitai et al. |
| 8,655,178 B2 | 2/2014 | Capron et al. |
| 8,665,178 B1 | 3/2014 | Wang |
| 8,666,208 B1 | 3/2014 | Amirparviz et al. |
| 8,736,963 B2 | 5/2014 | Robbins et al. |
| 8,743,464 B1 | 6/2014 | Amirparviz |
| 8,873,148 B1 | 10/2014 | Gupta et al. |
| 8,913,865 B1 | 12/2014 | Bennett |
| 8,965,152 B2 | 2/2015 | Simmonds |
| 9,025,253 B2 | 5/2015 | Hadad et al. |
| 9,541,762 B2 | 1/2017 | Mukawa et al. |
| 9,551,880 B2 | 1/2017 | Amitai |
| 9,606,354 B2 | 3/2017 | Spitzer et al. |
| 9,709,809 B2 | 7/2017 | Miyawaki et al. |
| 9,753,286 B2 | 9/2017 | Gao et al. |
| 9,766,459 B2 | 9/2017 | Alton et al. |
| 9,798,061 B2 | 10/2017 | Hsiao et al. |
| 9,805,633 B2 | 10/2017 | Zheng |
| 9,927,614 B2 | 3/2018 | Vallius |
| 9,933,684 B2 | 4/2018 | Brown et al. |
| 10,007,115 B2 | 6/2018 | Greenhalgh et al. |
| 10,077,188 B2 | 9/2018 | Dai et al. |
| 10,198,865 B2 | 2/2019 | Kezele et al. |
| 10,222,535 B2 | 3/2019 | Remhof et al. |
| 10,302,957 B2 | 5/2019 | Sissom |
| 10,326,983 B2 | 6/2019 | Hua et al. |
| 10,409,064 B2 | 9/2019 | Hongseok et al. |
| 10,564,430 B2 | 2/2020 | Amitai et al. |
| 11,543,583 B2 * | 1/2023 | Eisenfeld ............. G02B 6/0015 |
| 2001/0030860 A1 | 10/2001 | Kimura et al. |
| 2002/0015233 A1 | 2/2002 | Park |
| 2002/0089746 A1 | 7/2002 | Akitaka |

(56) References Cited

U.S. PATENT DOCUMENTS

| | | |
|---|---|---|
| 2002/0176173 A1 | 11/2002 | Song |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0072160 A1 | 4/2003 | Kuepper et al. |
| 2003/0090439 A1 | 5/2003 | Spitzer et al. |
| 2003/0165017 A1 | 9/2003 | Amitai et al. |
| 2003/0197938 A1 | 10/2003 | Schmidt et al. |
| 2003/0218718 A1 | 11/2003 | Moliton et al. |
| 2004/0085649 A1 | 5/2004 | Repetto et al. |
| 2004/0137189 A1 | 7/2004 | Tellini et al. |
| 2004/0233534 A1 | 11/2004 | Nakanishi et al. |
| 2005/0012842 A1 | 1/2005 | Miyagawa et al. |
| 2005/0018308 A1 | 1/2005 | Cassarly et al. |
| 2005/0024849 A1 | 2/2005 | Parker et al. |
| 2005/0084210 A1 | 4/2005 | Cha |
| 2005/0174641 A1 | 8/2005 | Greenberg |
| 2005/0174658 A1 | 8/2005 | Long et al. |
| 2005/0180687 A1 | 8/2005 | Amitai et al. |
| 2005/0265044 A1 | 12/2005 | Chen et al. |
| 2006/0126182 A1 | 6/2006 | Levola |
| 2006/0268421 A1 | 11/2006 | Shimizu et al. |
| 2006/0274420 A1 | 12/2006 | Chang |
| 2007/0008624 A1 | 1/2007 | Hirayama |
| 2007/0041591 A1 | 2/2007 | Suguta et al. |
| 2007/0070859 A1 | 3/2007 | Hirayama |
| 2007/0165192 A1 | 7/2007 | Prior |
| 2007/0188837 A1 | 8/2007 | Shimizu et al. |
| 2007/0211339 A1 | 9/2007 | Furusato |
| 2008/0025667 A1 | 1/2008 | Amitai |
| 2008/0009458 A1 | 4/2008 | Hirayama |
| 2008/0094586 A1 | 4/2008 | Hirayama |
| 2008/0151375 A1 | 6/2008 | Lin |
| 2008/0151379 A1 | 6/2008 | Amitai |
| 2008/0192239 A1 | 8/2008 | Otosaka |
| 2008/0198471 A1 | 8/2008 | Amitai |
| 2008/0247150 A1 | 10/2008 | Itoh et al. |
| 2008/0278812 A1 | 11/2008 | Amitai |
| 2009/0010023 A1 | 1/2009 | Kanade et al. |
| 2009/0052046 A1 | 2/2009 | Amitai |
| 2009/0059380 A1 | 3/2009 | Moliton |
| 2009/0122414 A1 | 5/2009 | Amitai |
| 2009/0190222 A1 | 7/2009 | Simmonds et al. |
| 2010/0027289 A1 | 2/2010 | Aiki et al. |
| 2010/0053148 A1 | 3/2010 | Khazeni et al. |
| 2010/0067110 A1 | 3/2010 | Yaakov et al. |
| 2010/0111472 A1 | 5/2010 | DeJong |
| 2010/0202128 A1 | 8/2010 | Saccomanno |
| 2010/0214635 A1 | 8/2010 | Sasaki et al. |
| 2010/0278480 A1 | 11/2010 | Vasylyev et al. |
| 2010/0291489 A1 | 11/2010 | Moskovits et al. |
| 2011/0002019 A1 | 1/2011 | Routley et al. |
| 2011/0096391 A1 | 4/2011 | Kanai et al. |
| 2011/0096566 A1 | 4/2011 | Tsai et al. |
| 2011/0176218 A1 | 7/2011 | Noui |
| 2011/0227661 A1 | 9/2011 | Numata et al. |
| 2011/0242661 A1 | 10/2011 | Simmonds |
| 2012/0039576 A1 | 2/2012 | Dangel et al. |
| 2012/0062850 A1 | 3/2012 | Travis |
| 2012/0062998 A1 | 3/2012 | Schultz et al. |
| 2012/0147361 A1 | 6/2012 | Mochizuki et al. |
| 2012/0176682 A1 | 7/2012 | DeJong |
| 2012/0194781 A1 | 8/2012 | Agurok |
| 2012/0200938 A1 | 8/2012 | Totani et al. |
| 2012/0306940 A1 | 12/2012 | Machida |
| 2013/0022316 A1 | 1/2013 | Pelletier et al. |
| 2013/0120224 A1 | 5/2013 | Cajigas et al. |
| 2013/0135749 A1 | 5/2013 | Akutsu et al. |
| 2013/0250430 A1 | 9/2013 | Robbins et al. |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0185142 A1 | 7/2014 | Gupta et al. |
| 2014/0226215 A1 | 8/2014 | Komatsu et al. |
| 2014/0226361 A1 | 8/2014 | Vasylyev |
| 2014/0232619 A1 | 8/2014 | Hiraide |
| 2015/0016777 A1 | 1/2015 | Abovitz et al. |
| 2015/0081313 A1 | 3/2015 | Boross et al. |
| 2015/0138451 A1 | 5/2015 | Amitai |
| 2015/0138646 A1 | 5/2015 | Tatsugi |
| 2015/0153569 A1 | 6/2015 | Yonekubo |
| 2015/0160529 A1 | 6/2015 | Popovich et al. |
| 2015/0182348 A1 | 7/2015 | Siegal et al. |
| 2015/0182748 A1 | 7/2015 | Gefen et al. |
| 2015/0219834 A1 | 8/2015 | Nichol et al. |
| 2015/0241619 A1 | 8/2015 | Richards et al. |
| 2016/0116743 A1 | 4/2016 | Amitai |
| 2016/0170214 A1 | 6/2016 | Amitai |
| 2016/0234485 A1 | 8/2016 | Robbins et al. |
| 2016/0238844 A1 | 8/2016 | Dobschal |
| 2016/0031456 A1 | 10/2016 | Jones et al. |
| 2016/0313567 A1 | 10/2016 | Kurashige |
| 2016/0341964 A1 | 11/2016 | Amitai |
| 2016/0363679 A1 | 12/2016 | Jurok et al. |
| 2016/0370589 A1 | 12/2016 | Wang |
| 2016/0370693 A1 | 12/2016 | Watanabe |
| 2017/0003504 A1 | 1/2017 | Vallius |
| 2017/0045743 A1 | 2/2017 | Dobschal et al. |
| 2017/0045744 A1 | 2/2017 | Amitai |
| 2017/0075119 A1 | 3/2017 | Schultz et al. |
| 2017/0097506 A1 | 4/2017 | Schowengerdt et al. |
| 2017/0122725 A1 | 5/2017 | Yeoh |
| 2017/0242249 A1 | 8/2017 | Wall |
| 2017/0255012 A1 | 9/2017 | Tam |
| 2017/0276947 A1 | 9/2017 | Yokoyama |
| 2017/0336636 A1 | 11/2017 | Amitai et al. |
| 2017/0343822 A1 | 11/2017 | Border et al. |
| 2017/0357095 A1 | 12/2017 | Amitai |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0101087 A1 | 4/2018 | Shinohara |
| 2018/0157057 A1 | 6/2018 | Gelberg et al. |
| 2018/0023177 A1 | 8/2018 | Schuck et al. |
| 2018/0267309 A1 | 9/2018 | Klug |
| 2018/0284443 A1 | 10/2018 | Matsuki et al. |
| 2018/0292599 A1 | 10/2018 | Ofir et al. |
| 2018/0372940 A1 | 12/2018 | Ishii et al. |
| 2019/0011710 A1 | 1/2019 | Amitai |
| 2019/0056600 A1 | 2/2019 | Danziger et al. |
| 2019/0064518 A1 | 2/2019 | Danziger |
| 2019/0086674 A1 | 3/2019 | Sinay et al. |
| 2019/0137818 A1 | 5/2019 | Saito |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0293856 A1 | 9/2019 | Danziger |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2021/0149204 A1 | 5/2021 | Amitai |

FOREIGN PATENT DOCUMENTS

| | | |
|---|---|---|
| CN | 101846799 A | 9/2010 |
| CN | 103837988 | 6/2014 |
| CN | 106079770 A | 11/2016 |
| CN | 106104569 | 11/2016 |
| CN | 107238928 | 10/2017 |
| CN | 206804895 U | 12/2017 |
| DE | 1422172 | 11/1970 |
| DE | 19725262 | 12/1998 |
| DE | 102013106392 | 12/2014 |
| EP | 0365406 | 4/1990 |
| EP | 0380035 | 8/1990 |
| EP | 0399865 | 11/1990 |
| EP | 0543718 | 5/1993 |
| EP | 0566004 | 10/1993 |
| EP | 1158336 | 11/2001 |

(56) References Cited

FOREIGN PATENT DOCUMENTS

| | | |
|---|---|---|
| EP | 1180711 | 2/2002 |
| EP | 1326102 | 7/2003 |
| EP | 1385023 | 1/2004 |
| EP | 1485747 | 12/2004 |
| EP | 1562066 | 8/2005 |
| EP | 0770818 | 4/2007 |
| EP | 1779159 | 5/2007 |
| EP | 2530510 | 12/2012 |
| FR | 2496905 | 6/1982 |
| FR | 2638242 | 4/1990 |
| FR | 2721872 | 1/1996 |
| GB | 1514977 | 6/1978 |
| GB | 2220081 | 12/1989 |
| GB | 2272980 | 6/1994 |
| GB | 2278222 | 11/1994 |
| GB | 2278888 | 12/1994 |
| GB | 2495398 | 4/2013 |
| JP | 58217901 A | 12/1983 |
| JP | H02182447 | 7/1990 |
| JP | 04-159503 | 6/1992 |
| JP | 09085874 A | 9/1995 |
| JP | 07280999 A | 10/1995 |
| JP | H09-258062 | 10/1997 |
| JP | 2001021448 | 1/2001 |
| JP | 2001343608 | 12/2001 |
| JP | 2002539498 | 11/2002 |
| JP | 2003337298 | 11/2002 |
| JP | 2003140081 | 5/2003 |
| JP | 2003149643 | 5/2003 |
| JP | 2003536102 | 12/2003 |
| JP | 2004527801 | 9/2004 |
| JP | 2005084522 | 3/2005 |
| JP | 2005164982 A | 6/2005 |
| JP | 2007010830 A | 6/2005 |
| JP | 2006003872 | 1/2006 |
| JP | 2006145644 | 6/2006 |
| JP | 2008053517 | 3/2008 |
| JP | 2011221235 | 11/2011 |
| JP | 2012123936 | 6/2012 |
| JP | 2012163659 | 8/2012 |
| JP | 2012-198263 | 10/2012 |
| JP | 2016028275 | 2/2016 |
| JP | 2012058404 | 3/2021 |
| TW | 201809798 | 3/2018 |
| WO | 9510106 | 4/1995 |
| WO | 9815868 | 4/1998 |
| WO | 1998/058291 | 12/1998 |
| WO | 9952002 | 10/1999 |
| WO | 0004407 | 1/2000 |
| WO | 0063738 | 10/2000 |
| WO | 0127685 | 4/2001 |
| WO | 0195025 | 12/2001 |
| WO | 0195027 | 12/2001 |
| WO | 02082168 | 10/2002 |
| WO | 03058320 | 7/2003 |
| WO | 03081320 | 10/2003 |
| WO | 2004109349 | 12/2004 |
| WO | 2005024485 | 3/2005 |
| WO | 2005024491 | 3/2005 |
| WO | 2005024969 | 3/2005 |
| WO | 2005093493 | 10/2005 |
| WO | 2005124427 | 12/2005 |
| WO | 2006013565 | 2/2006 |
| WO | 2006085308 | 8/2006 |
| WO | 2006085309 | 8/2006 |
| WO | 2006085310 | 8/2006 |
| WO | 2006087709 | 8/2006 |
| WO | 2006098097 | 9/2006 |
| WO | 2007054928 | 5/2007 |
| WO | 2007093983 | 8/2007 |
| WO | 2008023367 | 2/2008 |
| WO | 2008129539 | 10/2008 |
| WO | 2008149339 | 12/2008 |
| WO | 2009009268 | 1/2009 |
| WO | 2009074638 | 6/2009 |
| WO | 2011130720 | 10/2011 |
| WO | 2013065656 | 5/2013 |
| WO | 2013175465 | 11/2013 |
| WO | 2013188464 | 12/2013 |
| WO | 2015081313 | 6/2015 |
| WO | 2015158828 | 10/2015 |
| WO | 2016103251 | 6/2016 |
| WO | 2016132347 | 8/2016 |
| WO | 2017106873 | 6/2017 |
| WO | 2017199232 | 11/2017 |

OTHER PUBLICATIONS

Abadias G. et al., "Review Article: Stress in Thin Films and Coatings: Current Status, Challenges, and Prospects", Journal of Vacuum Science & Technology A: Vacuum, Surfaces, and Films, (20180000), vol. 36, No. 2, doi:10.1116/1.5011790, p. 020801, XP012226807 [Y] 9 * The first paragraph of the right column at p. 020801-34; the first paragraph of the right column at p. 020801-40 * DOI: http://dx.doi.org/10.1116/1.5011790.

Weiblein R.J et al "Optimized moth-eye anti-reflective structures for As2S3 chalcogenide optical fibers" in May 2016Optics Express 24(10):10172.

Amotchkina T. et al; "Stress compensation with antireflection coatings for ultrafast laser applications: from theory to practice," Opt. Express 22, 30387-30393 (2014) Amotchkina T. et al. Dec. 31, 2014 (Dec. 31, 2014).

Mori H. et al., "Reflective coatings for the future x-ray mirror substrates", Proc. SPIE 10699, Space Telescopes and Instrumentation 2018: Ultraviolet to Gamma Ray, 1069941 (Jul. 6, 2018); available at URL <http://doi.org/10.1117/12.2313469> Mori H. et al. Jul. 6, 2018 (Jul. 6, 2018).

Chalifoux B.D. et al., "Compensating film stress in thin silicon substrates using ion implantation," Opt. Express 27, 11182-11195 (Jan. 21, 2019) Chalifoux B.D. et al. Jan. 21, 2019 (Jan. 21, 2019).

J. Wei et al; Glass-to-glass anodic bonding process and electrostatic force in J. Wei*, S.M.L. Nai, C.K. Wong, L.C. Lee J/Thin Solid Films 462-463 (2004) 487-491.

Salter, P. S. and Booth, M. J. et al. "Designing and aligning optical systems incorporating Liquid crystal spatial light modulators (SLMs)", Department of Engineering, University of Oxford, vr1.0, doi: 10.5281/zenodo.4518992 (published online Feb. 12, 2020) Salter, P. S. and Booth, M. J. Feb. 12, 2020 (Feb. 12, 2020).

* cited by examiner

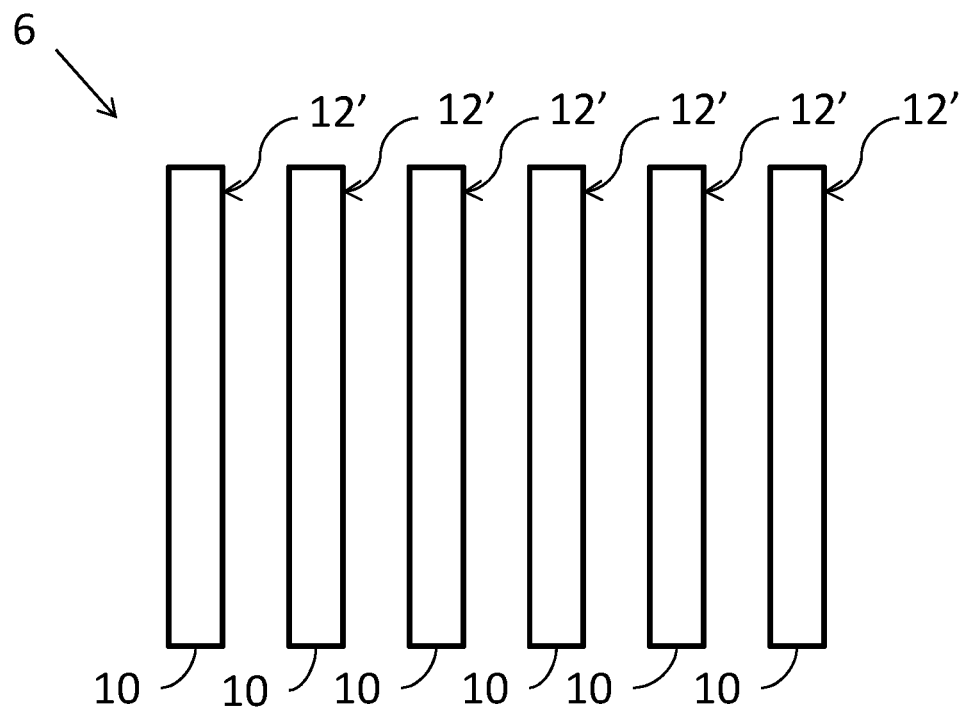
Fig. 6A
Fig. 6B
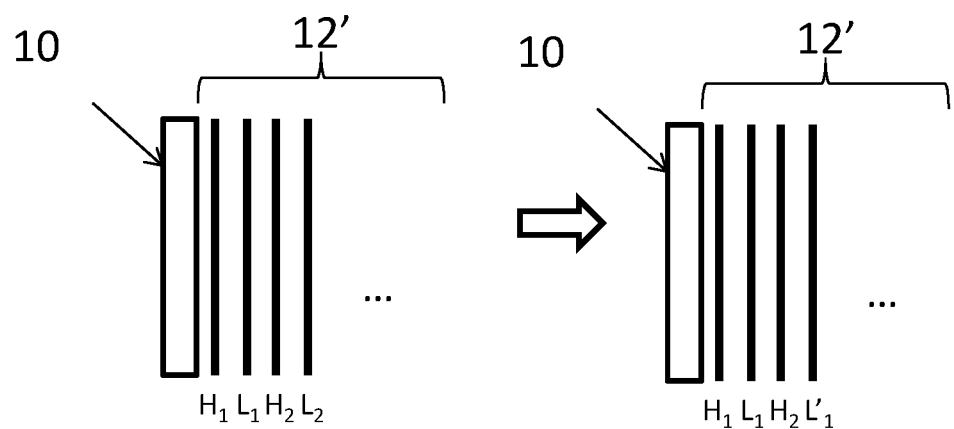

METHOD OF FABRICATING A LIGHT-GUIDE OPTICAL ELEMENT

TECHNICAL FIELD

The presently disclosed subject matter relates to a light-guide optical element, and, more particularly, to methods of fabricating a light-guide optical element.

BACKGROUND

Certain head-mounted displays (HMD) employ a light-guide optical element ("LOE"), also called a waveguide, that operates by trapping light waves inside a substrate by total internal reflections from the external surfaces of the waveguide. The light waves which are trapped inside the waveguide are coupled out by an array of partially reflective surfaces. The internal surfaces of the waveguide are typically made by joining a number of transparent flat plates. Prior to joining the plates, the plates are typically coated on one surface with a thin film partially reflective coating. In order to maintain image quality, the plates should be as flat as possible. However, the thin film and/or the coating process can impose stress on the plates and cause the plates to warp, leading to undesired curvature of the plates and a degradation of the quality of an image delivered by the LOE.

SUMMARY

According to one aspect of the presently disclosed subject matter there is provided a method of fabricating a light-guide optical element having a plurality of partially reflecting surfaces. The method includes providing a plurality of transparent plates, each plate polished on two opposite surfaces such that the surfaces are parallel to each other; coating a first of the surfaces of a subset of plates with a first coating: coating a second of the surfaces of the subset of plates with a second coating; bonding together the plurality of transparent plates to form a stack: and cutting the stack along parallel planes obliquely angled to the faces of the transparent plates so as to form the optical element; wherein the first coating is a partially reflective coating having a first set of mechanical properties, and the second coating is selected from the group consisting of: a coating similar to the first coating and a non-reflective coating having a second set of mechanical properties substantially similar to the first set of mechanical properties.

According to another aspect of the presently disclosed subject matter there is provided a light-guide optical element having at least one pair of parallel external surfaces including a plurality of partially reflecting surfaces made from a plurality of transparent plates having surfaces that are non-parallel to the pair of parallel external surfaces, each plate polished on two opposite surfaces such that the surfaces are parallel to each other; wherein each plate in a subset of plates is coated on one surface with a first coating and coated on the second surface with a second coating, wherein the first coating is a partially reflective coating having a first set of mechanical properties, and the second coating is selected from the group consisting of: a coating similar to the first coating and a non-reflective coating having a second set of mechanical properties substantially similar to the first set of mechanical properties.

According to some aspects of the presently disclosed subject matter the subset of plates is comprised of alternate plates in the plurality of plates, and the second coating is a coating similar to the first coating. At least one plate of the plurality of plates can be coated on a first surface with the first coating and on a second surface with a non-reflective coating having the second set of mechanical properties.

According to some aspects of the presently disclosed subject matter the subset of plates is comprised of all plates in the plurality of plates, and the second coating is a non-reflective coating having a second set of mechanical properties substantially similar to the first set of mechanical properties.

BRIEF DESCRIPTION OF THE DRAWINGS

In order to understand the invention and to see how it can be carried out in practice, embodiments will be described, by way of non-limiting examples, with reference to the accompanying drawings, in which:

FIGS. 6A-6B illustrate an embodiment of a single-side coating according to yet another embodiment of the presently disclosed subject matter.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, and components have not been described in detail so as not to obscure the presently disclosed subject matter.

Figure 1A:
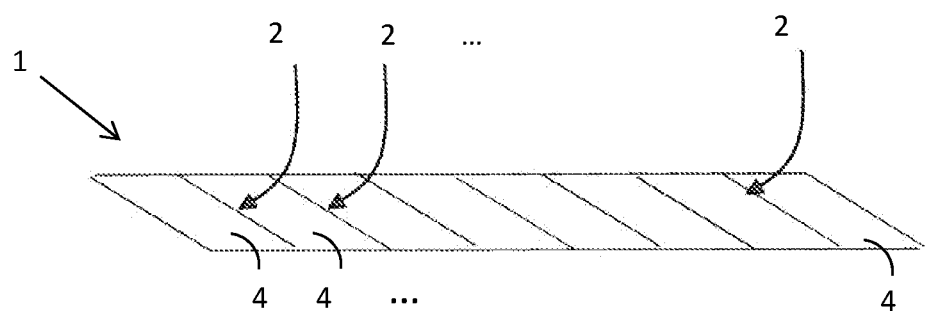
FIG. 1A illustrates a side view of a LOE according to the prior art.
Figure 1B:
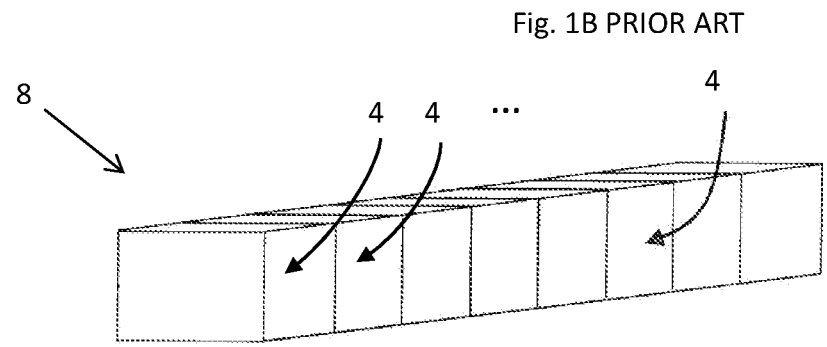
FIG. 1B illustrates an isometric view of a LOE according to the prior art.
Figure 1C:
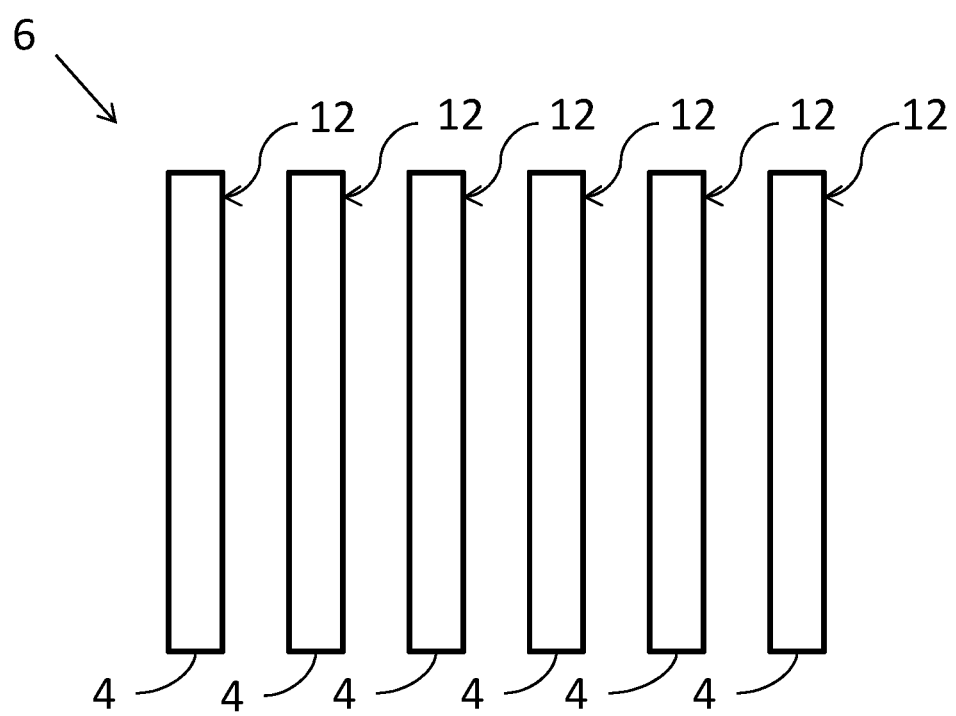
FIG. 1C illustrates a method of manufacture of a LOE according to the prior art.

Bearing this in mind, reference is now made to FIGS. 1A-1C, where there is illustrated a LOE made according to the prior art. FIG. 1A illustrates a side view of a LOE 8 having a plurality of plates 4 and a plurality of partially reflective internal surfaces 2. FIG. 1B illustrates an isometric view of LOE 8. FIG. 1C illustrates a prior art method of manufacture of LOE 8 in which each plate 4, prior to joining, is coated on one surface with a thin film partially reflective coating 12. As further illustrated in FIGS. 4A-4B, in which alternative prior art methods are shown, the plates are then bonded together to form a stack 6, and the stack sliced along parallel planes 16 to form LOE 8.

Typically, the partially reflective coating imposes a certain amount of stress on the surface to which it is applied. When applied to one surface of each plate and not the other, this stress can lead to the plate warping, creating an undesired curvature in the plate, which in turn can lead to the LOE propagating a poor quality image. The amount of warping is generally determined by the mechanical properties of the particular coating, e.g. the stress characteristics of the thin film coating, and/or as a result of the coating process. For example, the coating materials can have inherent properties that relate to stress caused in the coated film. These properties include a directional stress property, which can be, for example, tensile or compressive. The stress can be caused by different expansion coefficients under temperature change of the various coating layers and/or materials, or between the coating and the plate.

The inventors have found a way to mitigate the negative effects of stress on a plate caused by the partially reflective coating, thereby reducing the amount of warping or eliminating it altogether. Specifically, according to certain particularly preferred implementations of the present invention, some or all of the plates are coated on opposing surfaces with coatings that have similar stress characteristics, as will be more fully detailed below.

Figure 2A:
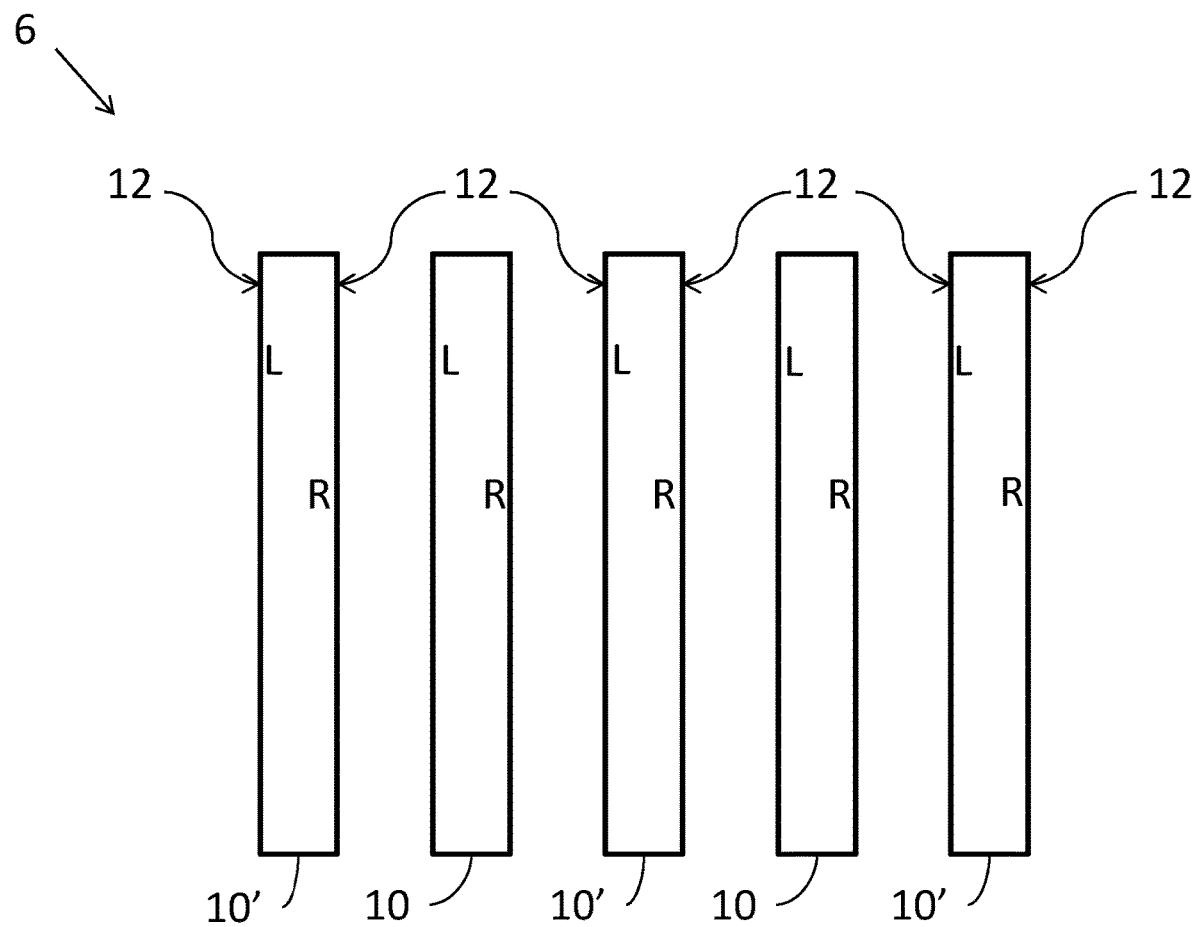
FIG. 2A illustrates a method of manufacturing a LOE according to a first embodiment of the presently disclosed subject matter.
Figure 2B:
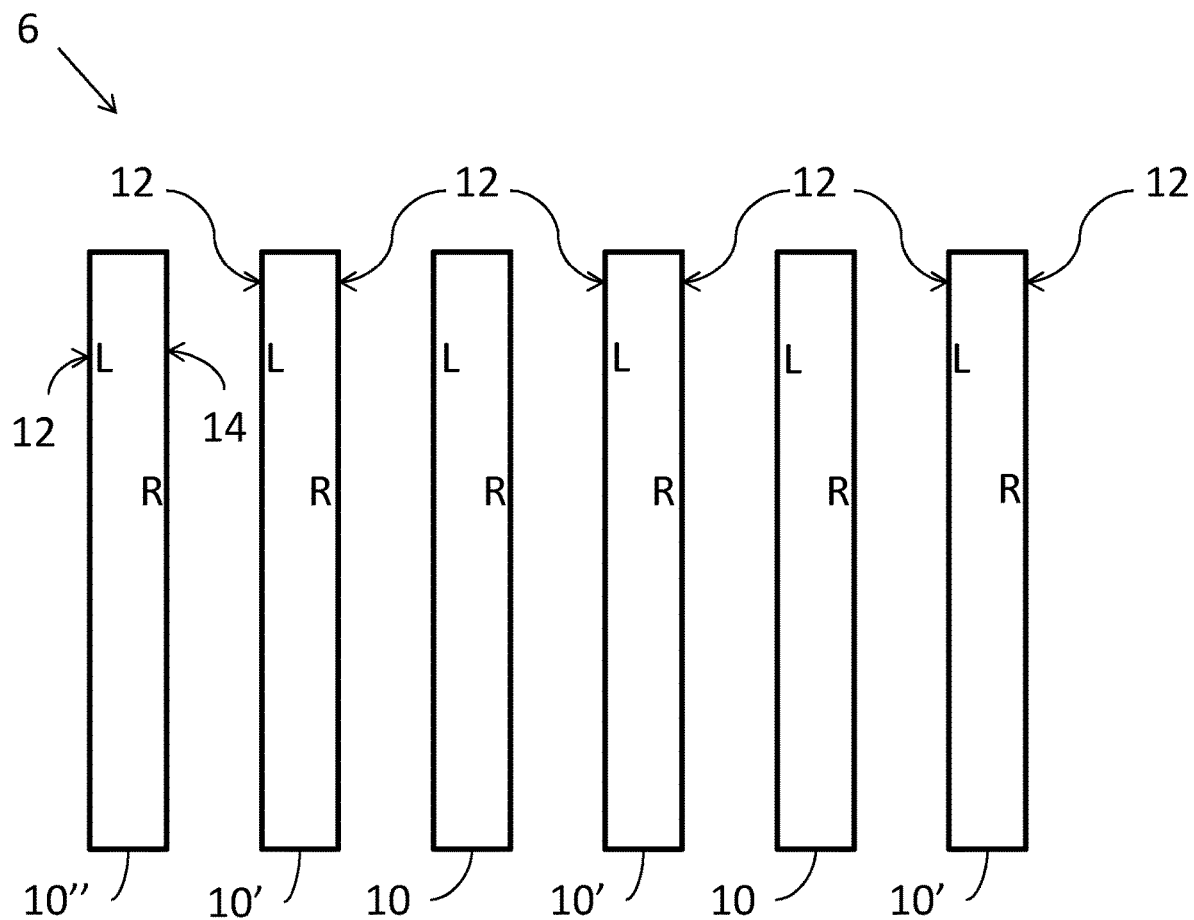
FIG. 2B illustrates a particularly preferred method of manufacturing a LOE according to the first embodiment of the presently disclosed subject matter.
Figure 3:
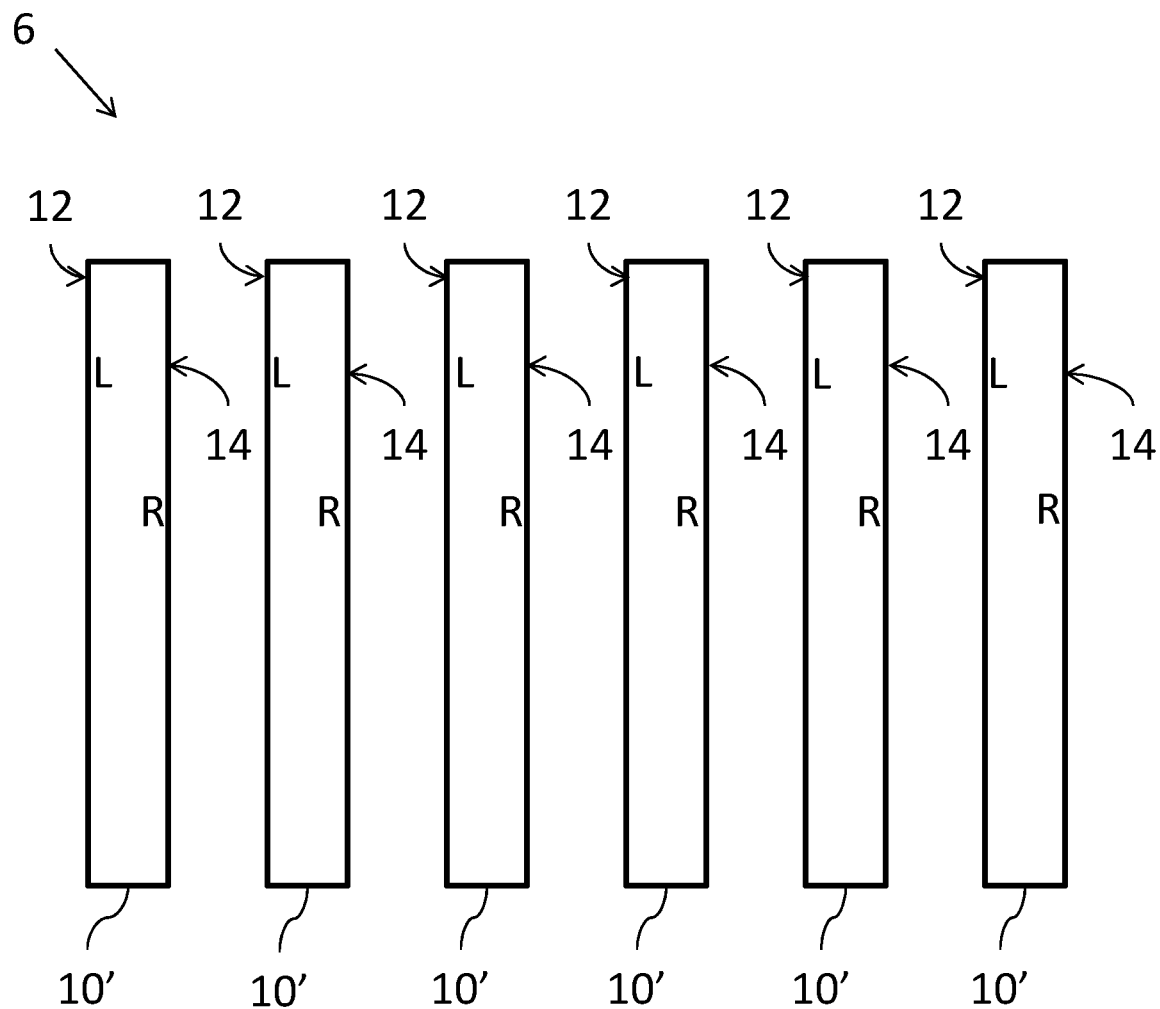
FIG. 3 illustrates a method of manufacturing a LOE according to a second embodiment of the presently disclosed subject matter.

Referring now to FIGS. 2A, 2B and 3, there are illustrated two methods of fabricating a LOE of the present invention in accordance with certain embodiments of the presently disclosed subject matter. Both methods initially provide a plurality of transparent plates 10, where each plate has been polished on two opposite surfaces such that the opposite surfaces are parallel to one another. For purposes of clarity, in the foregoing description, the two opposite surfaces may sometimes be referred to as the "left" and "right" surfaces. It should be understood that for the purposes of the invention these descriptive designations are meant only to differentiate the two opposing surfaces for the purpose of the present description, but are not in any way indicative of any particular order and/or optical properties of the plates either during processing or in the final product.

As shown in FIGS. 2A, 2B and 3, a first coating, being a partially reflective coating 12, is then coated onto one of the surfaces of at least some of the plates 10 (referred to herein as a "subset" of the plates). In FIGS. 2A, 2B and 3 the plates in the subset are indicated as 10'. By way of example, FIGS. 2A, 2B and 3 show the partially reflective coating 12 applied to the left surface of plates 10'. A second coating, which depending on the particular embodiment can be either the same coating or a different coating, is then coated onto the second surface of plates 10', as will be detailed below.

In certain embodiments, some LOEs may require different amounts of reflectivity in the different plates. Therefore, the reference to a "first coating" or "partially reflective coating" should be taken to refer to one coating from a group of coatings which are all partially reflective but may vary in their respective reflective parameters. In certain embodiments, the reflective parameters can be progressively changed for each subsequent surface according to the specific LOE design requirements.

In a first embodiment, as illustrated in FIG. 2A, the subset of plates is composed of alternating plates, and each plate 10' in the subset is coated on both the left and right surfaces with the partially reflective coating 12. The remaining plates are not coated. Since coated plates are coated on both sides with similar coatings, any coating-induced stress imposed on such plates is imposed equally on both opposing surfaces, thereby reducing or eliminating the warping effect. It should be understood that "similar" coatings refer to coatings of similarly imposing stress that may or may not be fabricated with the same compositions, number of layers, and total thickness.

Figure 4A:
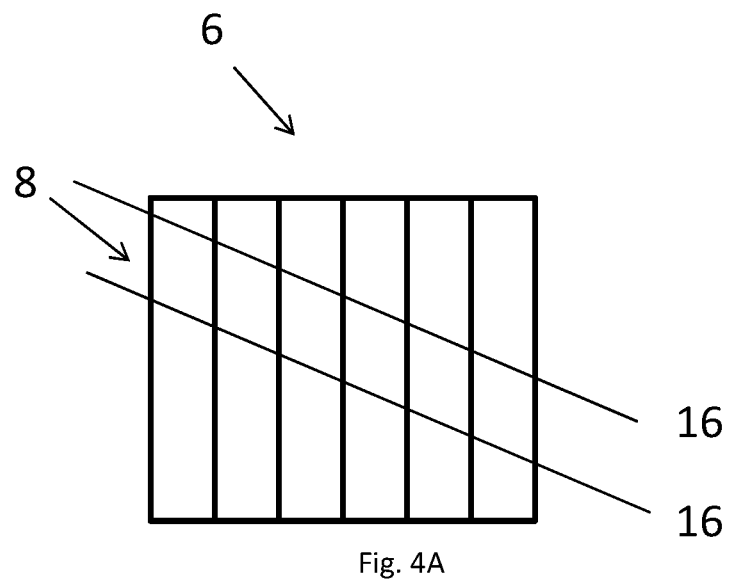
FIG. 4A illustrates a stack cut along parallel planes according to a first embodiment of the presently disclosed subject matter.
Figure 4B:
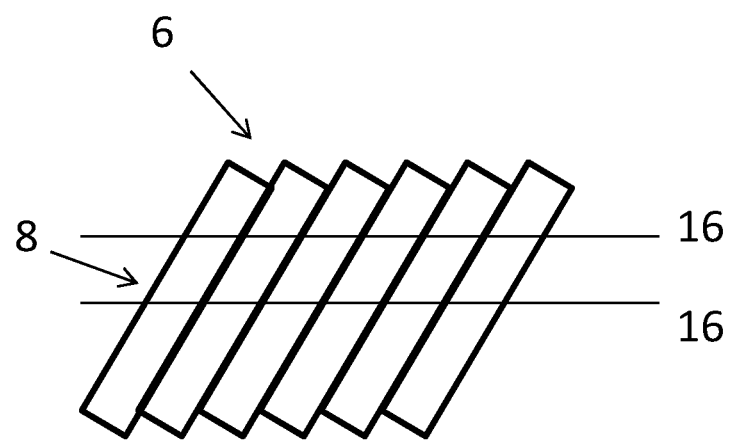
FIG. 4B illustrates a stack cut along parallel planes according to a second embodiment of the presently disclosed subject matter.

It should be noted that, as shown in FIGS. 4A-4B, plates are joined together to form the LOE, therefore there is no need to coat every plate with the partially reflective coating, i.e. it makes no difference to the optical properties which plate, as between two adjoining plates, has the coating. Therefore, the inventors have found it advantageous to apply the partially reflective coating to both surfaces of every other plate, and no coating on the other plates. This way, any deviation in the flatness of a plate caused by the coating is balanced by a likewise deviation on the other side, reducing or eliminating the overall curvature of the plate. In addition, the plates can be coated on both sides simultaneously.

In certain particularly preferred embodiments, and as shown in FIG. 2B, in cases where there are an uneven number of optically active surfaces, plate 10'' (which could be the last plate as shown in FIG. 2B, or it can alternatively be a plate positioned anywhere in the stack) is coated on one surface with the partially reflective coating 12 and on the opposing surface with a neutralizing coating 14, as will be further detailed below with reference to the second embodiment as shown in FIG. 3.

The partially reflective coatings are preferably implemented as multi-layer dielectric coatings with layers having alternating high and low (and possibly also an intermediate value) refractive indices, and with differing layer thicknesses, where the thicknesses and layer properties are chosen according to algorithms to provide the desired optical properties, all as is known in the art, and as can be derived using standard software tools known in the art. Similarly, the second coating is preferably implemented using the same approach and technology, but where the defined optical properties are those of an anti-reflective coating for all relevant angles. The anti-reflective properties could typically be achieved with a smaller number of layers than the partially reflective coatings but are preferably implemented using the same number of layers as the partially-reflective coating in order to achieve the similar mechanical properties, as discussed further below.

In a second embodiment, as illustrated in FIG. 3, the subset of plates is composed of all plates, and each plate 10' in the subset is coated on the first surface (e.g. show as the left surface in FIG. 3) with the partially reflective coating 12, and is coated on the second surface (e.g. show as the right surface in FIG. 3) with a neutralizing coating 14. The neutralizing coating 14 has no discernable effect on the transmission of light (i.e. is non-reflective), but has mechanical properties, namely stress characteristics, substantially similar to the partially reflective coating 12. Therefore, with the application of the neutralizing coating 14 on the other surface (i.e. the surface without coating 12) substantially equivalent stress is imposed on both surfaces of each coated plate, thereby reducing or eliminating the warping effect. In this embodiment, while each plate is coated, the plates are coated on both sides with coatings that have equivalent stress characteristics. As a result, similar to the first embodiment, any deviation in the flatness of a plate caused by the coating is balanced by an equal deviation on the other side, reducing or eliminating the overall curvature of the plate.

In certain embodiments, the neutralizing coating 14 is an anti-reflective coating, as mentioned. In certain particularly preferred implementations, the anti-reflective coating is a coating of similar layer compositions and number of layers as the partially reflective coating but applied with thicknesses chosen to produce anti-reflective optical properties. In many cases, the use of the same number of layers with the same compositions, just with different thicknesses, provides a sufficiently similar stress effect to reduce any residual warping of the plates to acceptable levels. However, the use of different layer compositions and/or numbers of layers for the "stress-neutralizing" coating also falls within the scope of the present invention.

In certain embodiments, the partially reflective coating and the neutralizing coating can be applied to a plate simultaneously. In certain embodiments, after applying the coatings, the plates can warp and then get corrected. In certain embodiments, the stress is caused by the coating process and/or during cooling after the coating is applied.

It should be noted that by "substantially similar" mechanical properties, it is meant that the mechanical properties are sufficiently similar that warping of the plates is reduced, and preferably eliminated. In many cases, there will in fact be differences in layer thickness between the coatings on the two sides of the plate, either to achieve slightly different proportions of reflectance/transmittance and/or to achieve anti-reflective properties, but the use of similar sequences of coatings, particularly where the number of layers and their compositions are the same, have been found in many cases to be "substantially similar" to the extent that they achieve a sufficiently high degree of stress cancellation for a high quality product.

Referring now to FIGS. 4A-4B, as in the prior art methods, in both of the above described embodiments, the LOE 8 is then formed by bonding together the plates to form a stack 6, and cutting the stack along parallel planes 16 obliquely angled to the faces of the plates so as to form the optical element. In certain embodiments, the plates could be bonded in an adhesive-free bonding process, such as anodic bonding.

In some embodiments, as shown in FIG. 4A, the plates can be stacked without angling, in which case the stack 6 is cut along parallel planes that are angled relative to the surfaces of the plates. In other embodiments, as shown in FIG. 4B, the plates themselves are angled in the stack, in which case the stack 6 is cut straight. In some embodiments (not shown), the stack can be cut along additional planes, e.g. to form a two-dimensional waveguide.

Figure 5A:
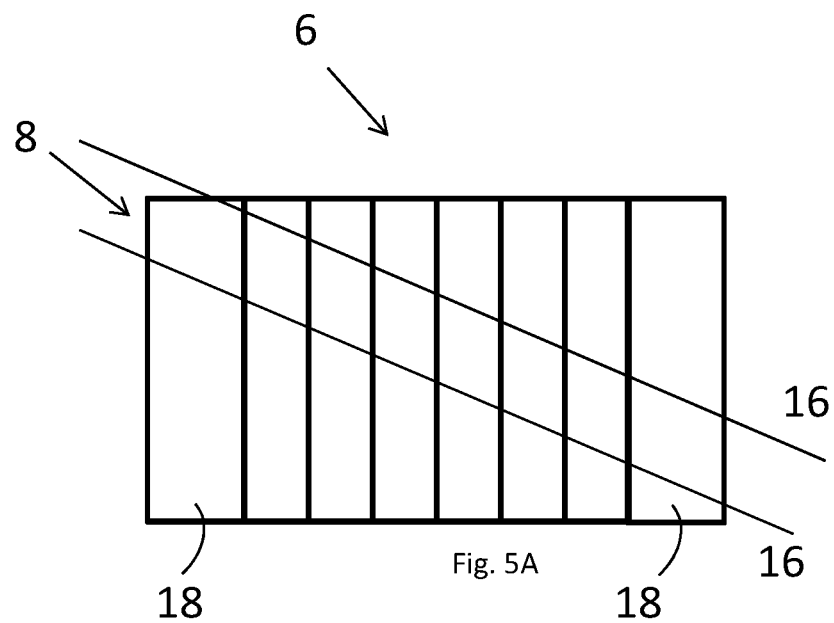
FIG. 5A illustrates an alternative stack to FIG. 4A, cut along parallel planes according to a second embodiment of the presently disclosed subject matter.
Figure 5B:
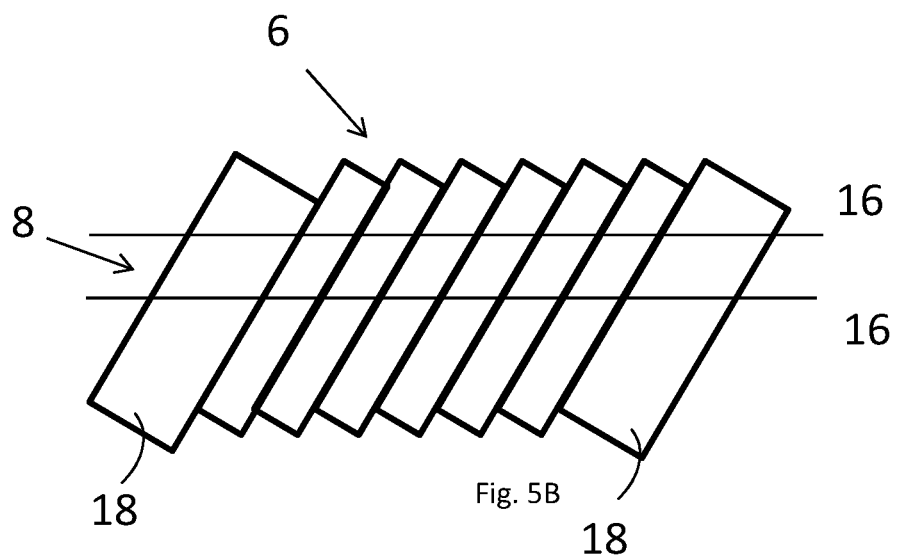
FIG. 5B illustrates an alternative stack to FIG. 4B, cut along parallel planes according to a second embodiment of the presently disclosed subject matter.

Referring to FIGS. 5A-5B, in some embodiments, there may be attached at the ends of the stack 6 one or more end plates 18 having a different thickness than plates 10. In some embodiments, end plates 18 can also be coated with one or more coatings. These coatings can be the same or different coatings than the coatings applied to plates 10. In certain most particularly preferred embodiments, no coatings are applied to end plates 18.

In certain embodiments, some LOEs may require different amounts of reflectivity in the different plates. Therefore, the reference to a "first coating" or "partially reflective coating" should be taken to refer to one coating from a group of coatings which are all partially reflective but may vary in their respective reflective parameters. In certain embodiments, the reflective parameters can be progressively changed for each subsequent surface according to the specific LOE design requirements.

FIGS. 6A-6B illustrate schematically an embodiment in which each of plates 10 can be coated on one side only. Referring now to FIG. 6A, in some embodiments, each of the plurality of plates 10 in stack 6 is coated with a partially reflective coating 12'. Referring now to FIG. 6B, coating 12' may be comprised of alternating layers of a high index coating H having refractive index $R_h$, and low index coating L having refractive index $R_l$, where $R_h > R_l$. For example coating 12' can consist of alternating coatings $H_1$, $L_1$, $H_2$, $L_2$ . . . , etc. where H, is applied to the plate surface, followed by L, applied over $H_1$, followed by $H_2$ applied over $L_1$, followed by L, applied over $H_2$ . . . etc. as shown in the left-hand side of FIG. 6B. It should be understood that coatings H and/or L can themselves be comprised of multiple different coating materials that when combined achieve the desired refractive index, i.e. $R_h$ for the H coating layer and R, for L coating layer.

Since each of coatings H and L have respective inherent stress characteristics (tensile or compressive) when applied to the surface of a plate (which may vary according to the specific temperature, thickness, coating procedure, etc.) the overall stress of coating 12' can be calculated using known techniques such as the Stoney equation. The overall stress of 12' may be undesirable and causing warping of plate 10 when applied to one side of each plate, as discussed above.

However, the inventors have found that it is possible to substitute some of the H or L layers with a substitute H' or L' (as the case may be) made of a different material or combination of materials as shown in the right-hand portion of FIG. 6B. In this case, a coating 12' can be designed and constructed engineered to have overall neutral stress in the sense of having minimal or no tensile or compressive stress on plate 10. Thus coating 12' may now be applied to one side of each of plates 10 without causing undesirable warping of the plates.

For example, consider a coating consisting of seventeen (17) alternating layers of SiO2 (R~1.42) and Ta2O5 (R~2.075) applied from the plate surface outward as:

Layers 1, 3, 5, 7, 9, 11, 13, 15, 17=TA2O5
Layers 2, 4, 6, 8, 10, 12, 14, 16=SIO2

In this case, coating 12' will have an overall tensile stress of around 6 minutes over 216.4 MPa, which is undesirable for a single side coating. However, if some of the L layers (i.e. SiO2) are replaced with layers of L'=MgF2 (R~1.38), e.g.:

Layers 1, 3, 5, 7, 9, 11, 13, 15, 17: TA2O5
Layers 2, 4, 6, 14, 16: SIO2
Layers 8, 10, 12: MgF2 the MgF2 layers effectively neutralize the overall stress of coating 12' such that the overall stress created by coating 12' on plate 10 is minimal and therefore acceptable for a single side coating. It should be noted that the number of layers to be replaced is defined by the overall stress in the design and can change depending on number and stress properties of the materials and design and layers thicknesses.

It should further be noted that the refractive index of the substituted layer H' or L' should preferably have no more than a 6% deviation from the refractive index of the primary layer H or L (as the case may be).

The LOE fabricated according to the teaching of the presently disclosed subject can be used in a variety of applications, such as the various near-eye displays and associated applications described in patents and patent applications of Lumus (Israel).

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A method of fabricating a light-guide optical element having a plurality of partially reflecting surfaces comprising:
provide a plurality of transparent plates, each plate polished on two opposite surfaces such that said surfaces are parallel to each other;
coating a first of said surfaces of a subset of plates with a first coating;
coating a second of said surfaces of said subset of plates with a second coating;
bonding together the plurality of transparent plates to form a stack comprising an alternating arrangement of coated plates of the subset of plates and uncoated plates; and
cutting the stack along parallel planes obliquely angled to the faces of the transparent plates so as to form the light-guide optical element;
wherein the first coating is a partially reflective coating having a first set of mechanical properties, and the second coating is a partially reflective coating having a second set of mechanical properties substantially similar to the first set of mechanical properties.

2. The method of claim 1, wherein the first and second coatings are substantially the same.

3. A light-guide optical element having at least one pair of parallel external surfaces comprising:
a plurality of internal partially reflecting surfaces made from a plurality of transparent plates, each plate having opposite first and second surfaces that are non-parallel to the pair of parallel external surfaces, each plate polished on said first and second surfaces such that said first and second surfaces are parallel to each other;
wherein each plate in a subset of the plurality of transparent plates is coated on the first surface with a first coating and coated on the second surface with a second coating, wherein the first coating is a partially reflective coating having a first set of mechanical properties, and the second coating is a non-reflective coating having a second set of mechanical properties substantially similar to the first set of mechanical properties, and
wherein the plurality of transparent plates are bonded together to form a stack comprising an alternating arrangement of coated plates of the subset of plates and uncoated plates.

4. A method of fabricating a light-guide optical element having a plurality of partially reflecting surfaces comprising:
providing a plurality of transparent plates, each plate polished on two opposite surfaces such that said surfaces are parallel to each other;
coating a first of said surfaces of each plates with a first coating;
bonding together the plurality of transparent plates to form a stack; and
cutting the stack along parallel planes obliquely angled to the faces of the transparent plates so as to form the light-guide optical element;
wherein the first coating is a partially reflective coating comprised of a plurality of layers of alternating high refractive index coating material and low refractive index coating material, and
wherein a first subset of the plurality of layers of the low index coating material is comprised of a first coating material have a first refractive index, and
wherein a second subset of the plurality of layers of the low index coating material is comprised of a second coating material have a second refractive index, and
wherein the combination of the high index coating material, first low index coating material and second low index coating material is effective to neutralize a stress imposed by the first coating on said plates.

5. The method of claim 1, wherein coating of said first and second surfaces of the subset of plates is performed simultaneously.

6. The method of claim 1, wherein the first set of mechanical properties and the second set of mechanical properties reduce or eliminate an amount of warping of the coated transparent plates due to stress on the coated transparent plates caused by the coatings.

7. The light-guide optical element of claim 3, wherein the first set of mechanical properties and the second set of mechanical properties reduce or eliminate an amount of warping of the coated transparent plates due to stress on the coated transparent plates caused by the coatings.

* * * * *